(12) United States Patent
Amiri et al.

(10) Patent No.: US 10,929,329 B2
(45) Date of Patent: *Feb. 23, 2021

(54) LOW POWER MULTILEVEL DRIVER FOR GENERATING WIRE SIGNALS ACCORDING TO SUMMATIONS OF A PLURALITY OF WEIGHTED ANALOG SIGNAL COMPONENTS HAVING WIRE-SPECIFIC SUB-CHANNEL WEIGHTS

(71) Applicant: Kandou Labs, S.A., Lausanne (CH)

(72) Inventors: Omid Talebi Amiri, Chavannes-près-Renens (CH); Armin Tajalli, Salt Lake City, UT (US)

(73) Assignee: KANDOU LABS, S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,284

(22) Filed: Dec. 3, 2019

(65) Prior Publication Data

US 2020/0104272 A1 Apr. 2, 2020

Related U.S. Application Data

(63) Continuation of application No. 15/698,567, filed on Sep. 7, 2017, now Pat. No. 10,496,583.

(51) Int. Cl.
*G06F 13/42* (2006.01)
*G06F 13/40* (2006.01)

(52) U.S. Cl.
CPC ...... *G06F 13/4072* (2013.01); *G06F 13/4208* (2013.01); *G06F 13/4265* (2013.01)

(58) Field of Classification Search
CPC .................. G06F 13/4072; G06F 13/4208
See application file for complete search history.

(56) References Cited

U.S. PATENT DOCUMENTS

| 5,539,360 A | 7/1996 | Vannatta et al. |
| 6,172,634 B1 | 1/2001 | Leonowich et al. |

(Continued)

FOREIGN PATENT DOCUMENTS

| CN | 101478286 A | 7/2009 | |
| WO | WO-2005032000 A1 * | 4/2005 | ........... H04L 1/0003 |

OTHER PUBLICATIONS

International Search Report and Written Opinion for PCT/US2018/049805, dated Nov. 1, 2018, 1-17 (17 pages).

*Primary Examiner* — Jing-Yih Shyu
(74) *Attorney, Agent, or Firm* — Invention Mine LLC (57) ABSTRACT

Methods and systems are described for receiving a set of input bits at a plurality of drivers and responsively generating an ensemble of signals, each respective signal of the ensemble of signals generated by receiving a subset of input bits at a respective driver connected to a respective wire of a multi-wire bus, the received subset of bits corresponding to sub-channels associated with the respective wire, generating a plurality of weighted analog signal components, each weighted analog signal component (i) having a corresponding weight and sign selected from a set of wire-specific sub-channel weights associated with the respective wire and (ii) modulated by a corresponding bit of the received subset of bits, and generating the respective signal by forming a summation of the plurality of weighted analog signal components at a common node connected to the respective wire for transmission over the respective wire of the multi-wire bus.

20 Claims, 11 Drawing Sheets

(56) References Cited

U.S. PATENT DOCUMENTS

| | | |
|---|---|---|
| 6,288,089 B1 | 9/2001 | Zawada et al. |
| 6,772,351 B1 | 8/2004 | Werner et al. |
| 7,093,145 B2 | 8/2006 | Werner et al. |
| 7,130,944 B2 | 10/2006 | Perino et al. |
| 7,176,823 B2 | 2/2007 | Zabroda |
| 7,269,212 B1 | 9/2007 | Chau et al. |
| 7,372,295 B1 | 5/2008 | Wei |
| 7,456,778 B2 | 11/2008 | Werner et al. |
| 7,462,956 B2 | 12/2008 | Lan et al. |
| 7,570,704 B2 | 8/2009 | Nagarajan et al. |
| 7,768,312 B2 * | 8/2010 | Hirose ............ H03K 19/00384 326/83 |
| 7,826,551 B2 | 11/2010 | Lee et al. |
| 7,859,356 B2 | 12/2010 | Pandey |
| 8,040,200 B2 | 10/2011 | Minegishi et al. |
| 8,199,849 B2 | 6/2012 | Oh et al. |
| 8,284,848 B2 | 10/2012 | Nam et al. |
| 8,295,336 B2 | 10/2012 | Lutz et al. |
| 8,520,348 B2 | 8/2013 | Dong |
| 8,975,948 B2 | 3/2015 | Gonzalez Diaz |
| 9,100,232 B1 | 8/2015 | Hormati et al. |
| 9,112,550 B1 * | 8/2015 | Ulrich ..................... H04B 3/04 |
| 9,288,089 B2 * | 3/2016 | Cronie ................ H04L 25/0272 |
| 9,362,974 B2 | 6/2016 | Fox et al. |
| 9,544,015 B2 | 1/2017 | Ulrich |
| 9,710,412 B2 | 7/2017 | Sengoku |
| 9,917,711 B2 | 3/2018 | Ulrich |
| 10,055,372 B2 | 8/2018 | Shokrollahi |
| 10,056,903 B2 | 8/2018 | Amiri et al. |
| 2001/0006538 A1 | 7/2001 | Simon et al. |
| 2002/0125933 A1 | 9/2002 | Tamura et al. |
| 2003/0085763 A1 | 5/2003 | Schrodinger et al. |
| 2004/0085091 A1 | 5/2004 | Brox |
| 2007/0002954 A1 | 1/2007 | Cornelius et al. |
| 2007/0121716 A1 | 5/2007 | Nagarajan et al. |
| 2008/0012598 A1 | 1/2008 | Mayer et al. |
| 2009/0002030 A1 | 1/2009 | Stojanovic et al. |
| 2009/0046009 A1 * | 2/2009 | Fujii .................... H04B 7/0417 342/373 |
| 2009/0237109 A1 | 9/2009 | Haig et al. |
| 2011/0268225 A1 * | 11/2011 | Cronie ................ H04L 25/0272 375/296 |
| 2012/0125665 A1 | 5/2012 | Masuda |
| 2012/0133438 A1 | 5/2012 | Tsuchi et al. |
| 2013/0307614 A1 | 11/2013 | Dai |
| 2014/0159769 A1 | 6/2014 | Hong et al. |
| 2014/0254712 A1 | 9/2014 | Lee et al. |
| 2015/0063494 A1 | 3/2015 | Simpson et al. |
| 2015/0331820 A1 | 11/2015 | Sengoku |
| 2015/0341193 A1 * | 11/2015 | Hormati ............ H04L 25/03343 375/296 |
| 2015/0349835 A1 | 12/2015 | Fox et al. |
| 2015/0381232 A1 | 12/2015 | Ulrich |
| 2016/0036616 A1 | 2/2016 | Holden et al. |
| 2016/0373141 A1 | 12/2016 | Chou et al. |

\* cited by examiner

$$\begin{bmatrix} 3 & 3 & 3 & 3 & 3 & 3 \\ 0 & 0 & 0 & 0 & -3 & 3 \\ 0 & 0 & 0 & -4 & 2 & 2 \\ 3 & -3 & 0 & 0 & 0 & 0 \\ 2 & 2 & -4 & 0 & 0 & 0 \\ -3 & -3 & -3 & 3 & 3 & 3 \end{bmatrix}$$

FIG. 11

LOW POWER MULTILEVEL DRIVER FOR GENERATING WIRE SIGNALS ACCORDING TO SUMMATIONS OF A PLURALITY OF WEIGHTED ANALOG SIGNAL COMPONENTS HAVING WIRE-SPECIFIC SUB-CHANNEL WEIGHTS

CROSS-REFERENCE TO RELATED APPLICATIONS

This Application is a continuation of U.S. application Ser. No. 15/698,567, filed Sep. 7, 2017, issued as U.S. Pat. No. 10,496,583 on Dec. 3, 2019, entitled "LOW POWER MULTILEVEL DRIVER FOR GENERATING WIRE SIGNALS ACCORDING TO SUMMATIONS OF A PLURALITY OF WEIGHTED ANALOG SIGNAL COMPONENTS HAVING WIRE-SPECIFIC SUB-CHANNEL WEIGHTS", which is hereby incorporated herein by reference in its entirety for all purposes.

REFERENCES

The following prior applications are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling", hereinafter identified as [Cronie I].

U.S. Pat. No. 9,100,232, issued Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi I].

U.S. patent application Ser. No. 14/315,306, filed Jun. 25, 2014, naming Roger Ulrich, entitled "Multilevel Driver for High Speed Chip-to-Chip Communications", hereinafter identified as [Ulrich I].

U.S. patent application Ser. No. 15/582,550, filed Apr. 28, 2017, naming Omid Talebi Amiri and Richard Simpson, entitled "Low Power Multilevel Driver", hereinafter identified as [Amiri I].

FIELD OF THE INVENTION

The present embodiments relate to communications systems circuits generally, and more particularly to the generation of multilevel output signals into a high-speed multi-wire interface used for chip-to-chip communication.

BACKGROUND

In communication systems, information may be transmitted from one physical location to another. Furthermore, it is typically desirable that the transport of this information is reliable, is fast and consumes a minimal amount of resources. One of the most common information transfer media is the serial communications link, which may be based on a single wire circuit relative to ground or other common reference, multiple such circuits relative to ground or other common reference, or multiple circuits used in relation to each other.

In the general case, a serial communications link is used over multiple time periods. In each such time period, a signal or signals over the link represents, and thus conveys, some amount of information typically measured in bits. Thus, at a high level, a serial communications link connects a transmitter to a receiver and the transmitter transmits a signal or signals each time period, the receiver receives signal or signals approximating those transmitted (as the result of signal degradation over the link, noise, and other distortions.) The information being conveyed by the transmitter is "consumed" by the transmitter, and representative signals are generated. The receiver attempts to determine the conveyed information from the signals it receives. In the absence of overall errors, the receiver can output exactly the bits that were consumed by the transmitter.

An example of a serial communications link is a differential signaling (DS) link. Differential signaling operates by sending a signal on one wire and the opposite of that signal on a paired wire; the signal information is represented by the difference between the wires rather than their absolute values relative to ground or other fixed reference. Differential signaling enhances the recoverability of the original signal at the receiver over single ended signaling (SES), by cancelling crosstalk and other common-mode noise. There are a number of signaling methods that maintain the desirable properties of DS while increasing pin-efficiency over DS. Many of these attempts operate on more than two wires simultaneously, using binary signals on each wire, but mapping information in groups of bits.

Vector signaling is a method of signaling. With vector signaling, pluralities of signals on a plurality of wires are considered collectively although each of the plurality of signals may be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector may refer to the number of degrees of freedom of signals on the plurality of wires instead of the number of wires in the plurality of wires.

With binary vector signaling, each component takes on a coordinate value (or "coordinate", for short) that is one of two possible values. As an example, eight SES wires may be considered collectively, with each component/wire taking on one of two values each signal period. A "code word" of this binary vector signaling is one of the possible states of that collective set of components/wires. A "vector signaling code" or "vector signaling vector set" is the collection of valid possible code words for a given vector signaling encoding scheme. A "binary vector signaling code" refers to a mapping and/or set of rules to map information bits to binary vectors. In the example of eight SES wires, where each component has a degree of freedom allowing it to be either of the two possible coordinates, the number of code words in the collection of code words is $2^8$, or 256. As with SES or DS links, output drivers used with a binary vector signaling code need only emit two distinct voltage- or current-levels, corresponding to the two possible coordinate values for each vector element.

With non-binary vector signaling, each component has a coordinate value that is a selection from a set of more than two possible values. A "non-binary vector signaling code" refers to a mapping and/or set of rules to map information bits to non-binary vectors. The corresponding output driver for a non-binary vector signaling code is configurable of emitting multiple voltage- or current-levels corresponding to the selected coordinate values for each vector output.

Examples of vector signaling methods are described in [Cronie I] and [Shokrollahi I]. One class of vector signaling codes they describe, known as Orthogonal Differential Vector Signaling (ODVS) codes, are defined by an "orthogonal" matrix, in which all rows are orthogonal to each other and the product of the matrix and its transpose is a matrix having non-zero values only on its diagonal. The encoded signal communicated by an ODVS code is a summation of multiple sub-channel signals, each modulated with an independent element of the data being communicated.

BRIEF DESCRIPTION

A transmitter and receiver can communicate using a serial communications link, wherein the serial communications link uses signaling based on a balanced vector signaling code. The vector signaling code transmits a vector of symbols using multiple wires of the communications link in each transmit unit interval. The number of components of the vector can be two, three, four, or more than four. The number of coordinate values for a component can be two, three, four, or more than four. For example, a link might use four components with four possible coordinate values: a high value, a low value, and inverses of the high and low values, such that a signal having the high value cancels out three signals having the inverse of the low value and a signal having the inverse of the high value cancels out three signals having the low value and, in this manner, the link can convey three bits in a signal period using those four components by mapping the eight possible three bit combinations onto the eight vector code words represented by the four permutations of one high value and three inverses of the low value plus the four permutations of the inverse of one high value and three low values. In a more specific embodiment, the high and low values are voltage values and relative to a reference, the high value and its inverse have the same magnitude but opposite signs, the low value and its inverse have the same magnitude but opposite signs, and the high value has a magnitude three times the low value. As another example, a different link might use three components chosen from three possible coordinate values: a positive value, a smaller positive value, and a smallest positive value or zero, such that the sum of all vector component values is a constant. Such a code is also balanced, albeit with an additional offset or DC component superimposed upon all possible coordinate values as is common practice in embodiments relying on single-ended power supplies.

Methods and systems are described for receiving a set of input bits at a plurality of drivers and responsively generating an ensemble of signals, each respective signal of the ensemble of signals generated by receiving a subset of input bits at a respective driver connected to a respective wire of a multi-wire bus, the received subset of bits corresponding to sub-channels associated with the respective wire, generating a plurality of weighted analog signal components, each weighted analog signal component (i) having a corresponding weight and sign selected from a set of wire-specific sub-channel weights associated with the respective wire and (ii) modulated by a corresponding bit of the received subset of bits, and generating the respective signal by forming a summation of the plurality of weighted analog signal components at a common node connected to the respective wire for transmission over the respective wire of the multi-wire bus.

In accordance with at least one embodiment, processes and apparatuses provide for transmitting data over physical channels to provide a high speed, low latency interface providing high total bandwidth at low power utilization, such as to interconnect integrated circuit chips in a multi-chip system. In some embodiments, different voltage, current, etc. levels are used for signaling and more than two levels may be used, such as a quaternary signaling system wherein each wire signal has one of four values.

This Brief Summary is provided to introduce a selection of concepts in a simplified form that are further described below in the Detailed Description. This Brief Summary is not intended to identify key or essential features of the claimed subject matter, nor is it intended to be used as an aid in determining the scope of the claimed subject matter. Other aspects of the present embodiments will be apparent to one of ordinary skill in the art upon review of the Detailed Description and the included drawings.

DETAILED DESCRIPTION

As described in [Cronie I] and [Shokrollahi I], vector signaling codes enable the efficient communication of data over a communications medium, typically comprised of multiple essentially parallel wires. For Orthogonal Differential Vector Signaling (ODVS) codes, up to N-1 bits of binary data may be carried over an N wire channel. It is conventional to describe such a system as encoding N-1 bits into an N element codeword, where the codeword represents the aggregate state of the transmission at each unit interval, with each codeword element being drawn from an alphabet of M possible values corresponding to the particular output state of each wire.

Using as an example the Glasswing code of [Shokrollahi I], five binary bits may be encoded into a six symbol codeword utilizing an alphabet of four distinct values. Thus, parallel transmission of the Glasswing code over six wires utilizes six single-wire output drivers, each configured to drive one of four voltage or current levels onto one wire of the six wire communications channel. A higher-performance variant of the Glasswing code utilizes an alphabet of ten values, such embodiments utilizing output drivers producing ten distinct values.

At the high data rates typically used in association with vector signaling codes (as one example, [Shokrollahi I] describes one embodiment of the Glasswing code operating at 25 Giga-codewords per second, i.e. a unit interval of 40 picoseconds) the output drivers include significantly large output transistors for providing the drive current as well as providing a low, stable output impedance to facilitate matching the transmission line impedance. As a concurrent issue, many high-speed integrated circuit processes provide only relatively high ohms-per-square resistive material, making fabrication of the tens-of-ohms resistors needed for driver line termination problematic.

Figure 1:
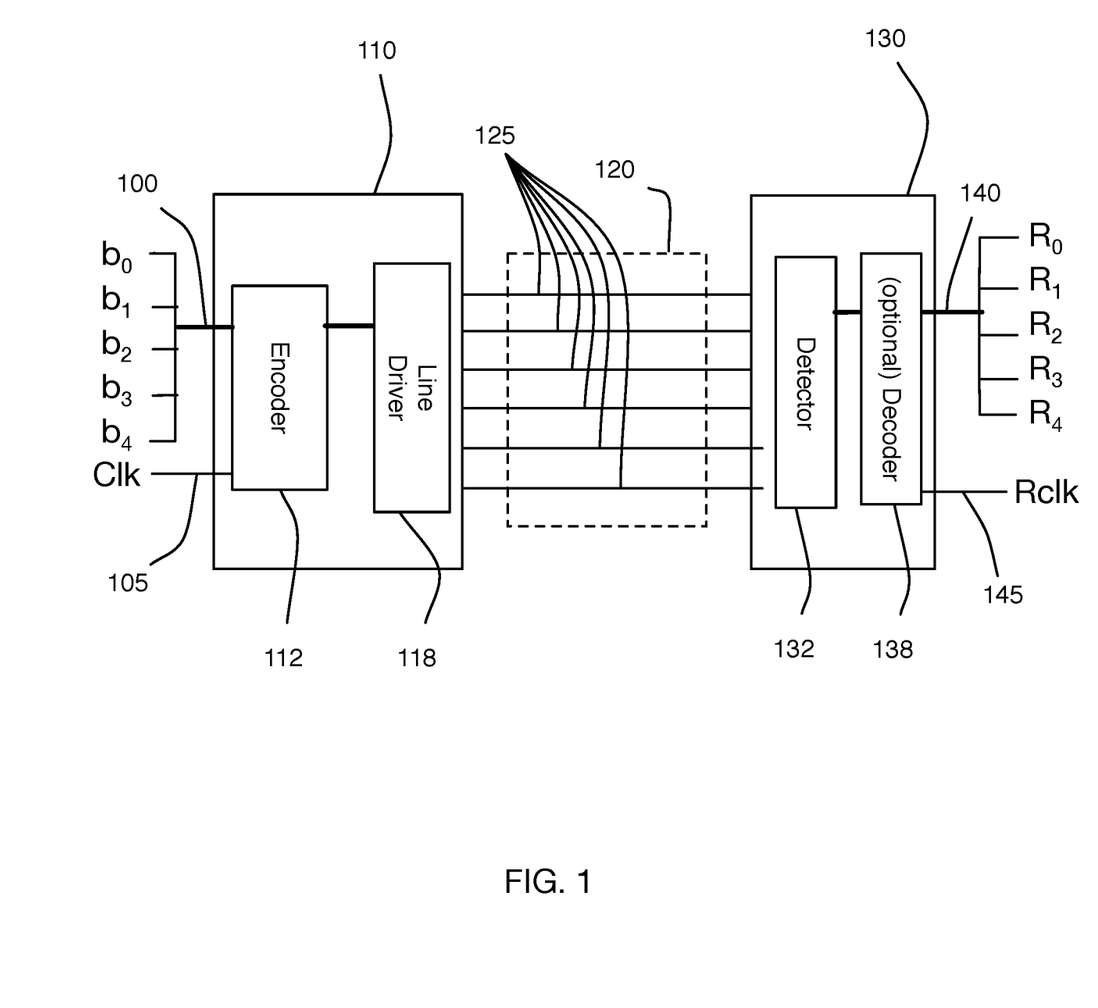
FIG. 1 is a block diagram of a communications system, in accordance with some embodiments.

FIG. 1 illustrates an exemplary system, in accordance with some embodiments. As shown, FIG. 1 includes a transmitter 110 that receives source data $B_0$-$B_4$ 100 and Clk 105, and an encoder 112 that encodes the information for transmission over a channel 120 including a multi-wire bus having multiple wires 125 via line driver 118. FIG. 1 further includes a receiver 130 including a detector 132 and in some embodiments, includes a decoder 138, if needed, for producing receive data $R_0$-$R_4$ 140 and a receive clock Rclk 145.

Parallel Output Driver Elements

As described in [Ulrich I], a more efficient embodiment utilizes multiple parallel line driver elements, each using smaller drive transistors and higher value output resistors, with the paralleled aggregate of multiple elements providing the drive current and matched line impedance. In such an architecture, the final output to each transmission line wire is an analog summation node for all of the driver elements for that wire, with intermediate output voltages being produced by the summation of different numbers of driver elements producing a high or a low output. [Ulrich I] further describes the incorporation of additional sets of driver elements to augment the codeword output with Finite Impulse Response (FIR) corrections, providing pre- and/or post-cursor compensation for inter-signal interference (ISI), waveform shaping, and other signal compensation.

[Amiri I] describes a simplified embodiment utilizing multiple parallel driver elements to produce multi-level vector signaling code outputs with low power consumption.

In these previously described vector signaling code embodiments, data to be transmitted is processed by an encoder, resulting in a codeword comprised of one symbol per output wire, which is then synchronously output essentially in parallel onto the multiple wires of the communications medium. Using an individual output driver element capable of emitting a single binary signal onto one wire as a building block, the architecture of these embodiments may be described as being vertically replicated to support the codeword width (i.e. the number of wires,) and replicated in depth to support the symbol alphabet (i.e. the number of signal levels represented by each symbol in the codeword.)

Wiring Complexity within the Output Driver

As the alphabet from which each symbol is drawn may have many elements (four or ten for the two previously described variations of the Glasswing code,) multiple signal wires are needed to carry an encoded representation of each symbol value from the encoder output to each wire's output driver. Furthermore, in practical high-speed embodiments, multiple processing phases may be used to achieve higher processing throughput, with a final high-speed multiplexor producing a combined data stream before output. [Ulrich I] gives an example of four phase processing of six-symbol codewords where each symbol is encoded as a four bit value, thus in that embodiment at least 4×6×4 signals are routed from the encoder output to the output driver, suggesting significant signal routing complexity.

Sub-Channel Output Driver

Figure 2:
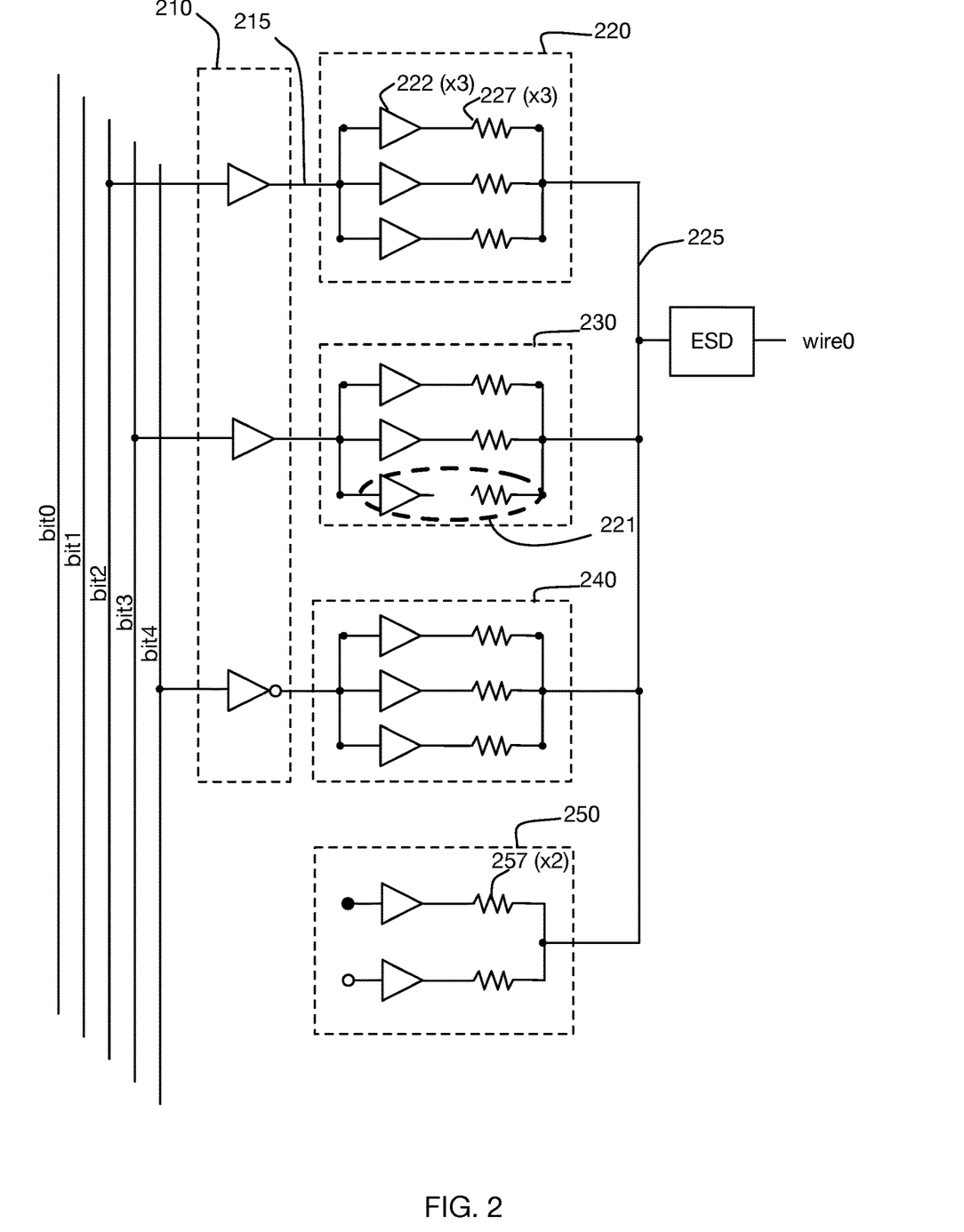
FIG. 2 is a schematic of an embodiment of a multilevel line driver for a single wire of a multi-wire communications channel.
Figure 3:
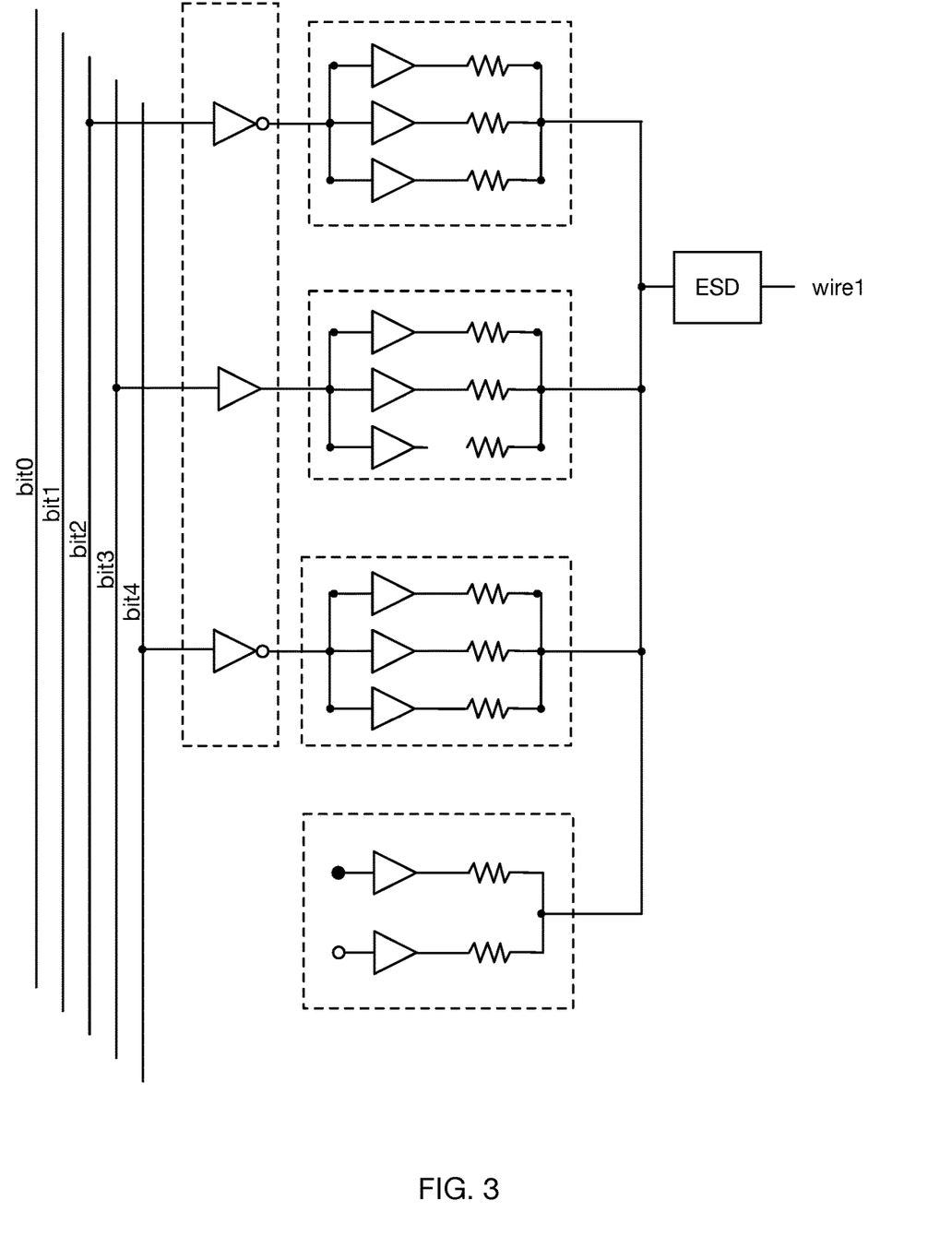
FIGS. 3-7 illustrate additional versions of multilevel line driver embodiments, each configured to drive a respective wire of a multi-wire communications channel.
Figure 11:
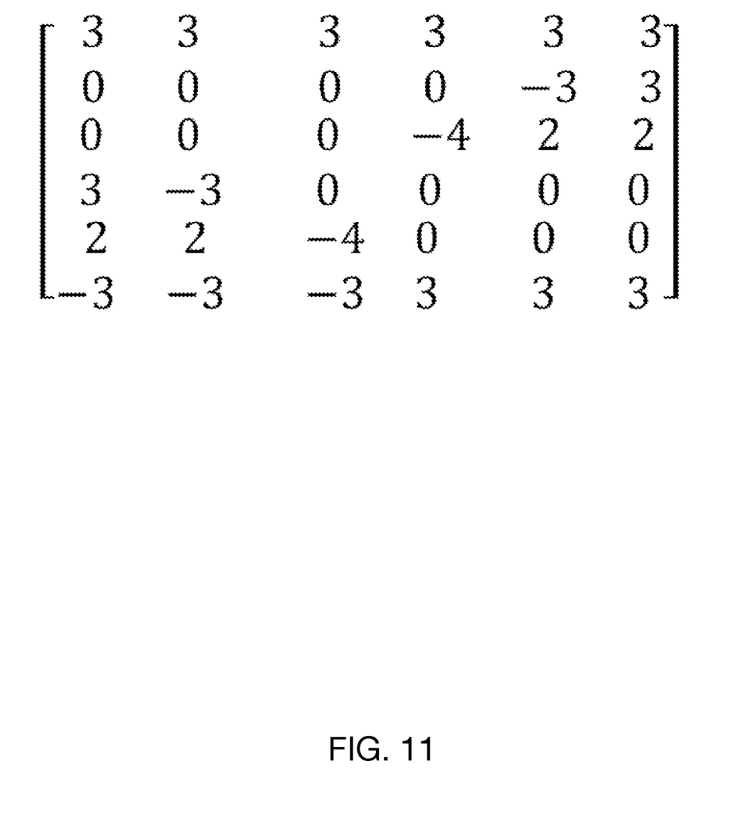
FIG. 11 illustrates an equal-eye matrix used in the Glasswing code, in accordance with some embodiments.

The embodiment illustrated in FIG. 2 also utilizes a plurality of driver elements ("slices" in the terminology used by [Ulrich I]) that collectively produce multi-level output signals, but in a different organization. As shown, each signal of the ensemble of signals is based on modulations of individual sub-channels by corresponding data, each modulated sub-channel producing an analog signal component. The signal of the ensemble of signals is thus formed by a summation of the analog signal components to produce. In some embodiments, the signal corresponds to a symbol, and the ensemble of signals (symbols) corresponds to an encoded output codeword. For descriptive purposes with no limitation implied, this example will use the "equal eyes" 5b6w_10_5 Glasswing code of [Shokrollahi I], which includes five orthogonal sub-channels each modulated by one data bit, plus a common mode signal component. FIG. 11 illustrates an equal-eye matrix for the Glasswing code, in accordance with some embodiments.

Including the sub-channel scaling factors that normalize detected signal amplitudes across all sub-channels, the defining matrix for the equal-eye Glasswing code is $$\vec{w} = \frac{1}{3} \times [0 \quad b0 \quad b1 \quad b2 \quad b3 \quad b4] \begin{bmatrix} 3 & 3 & 3 & 3 & 3 & 3 \\ 0 & 0 & 0 & 0 & -3 & 3 \\ 0 & 0 & 0 & -4 & 2 & 2 \\ 3 & -3 & 0 & 0 & 0 & 0 \\ 2 & 2 & -4 & 0 & 0 & 0 \\ -3 & -3 & -3 & 3 & 3 & 3 \end{bmatrix} \quad [\text{Eqn. 1}]$$

As described in [Shokrollahi I], each column of the matrix corresponds to a wire of the six-wire communications channel, the leftmost column corresponding to wire 0, and the rightmost column to wire 5. The first row of the matrix corresponds to the common mode of the communications channel, which may be utilized for biasing purposes but is typically not used for communication. The second through sixth rows correspond to sub-channels of the ODVS code, each used in this example to communicate a single data bit, identified in these examples as bit 0-bit 4 respectively. The values within the matrix have been computed to equalize detected signal strength (i.e. receive eye amplitude) among the sub-channels, and the overall scaling factor (here, ⅓) preserves the overall amplitude of the combined signal within the nominal range ±1.

Combining Sub-Channels to Produce Wire Outputs

Reading down an individual column of the matrix, one may observe that the aggregate output signal for a given wire is a linear combination of wire-specific sub-channel components each being modulated by individual data bits. Thus, for the leftmost column of Eqn. 1 corresponding to the set of wire-specific sub-channel components for wire 0, three wire-specific sub-channel components (3/3, 2/3, and −3/3, including the overall scaling factor) are modulated by data bits bit 2, bit 3, and bit 4, respectively. For the purposes of this description, a given wire-specific sub-channel component being "modulated" by a corresponding bit means the given wire-specific sub-channel component is multiplied by a value of '1' or '−1' depending on the value of the corresponding bit. For example, the wire-specific sub-channel component for bit 2 on wire 0 (3/3) may be +3/3 if bit 2 corresponds to a value of '1' or −3/3 if bit 2 corresponds to a value of '−1'.

FIG. 2 shows one embodiment, in which selected members of data values bit 0-bit 4 are provided to data buffer 210 and presented to sub-channel driver element groups 220, 230, 240. Each sub-channel driver element group includes a number of paralleled driver elements, each driver element including a push-pull output driver 222 and a series termination resistance 227. The outputs of the driver elements are combined 225 to produce the aggregate wire output signal for wire 0.

As is common practice, a conventional Electro-Static Discharge (ESD) protection circuit is shown in series with the wire output, to prevent circuit damage from accidental static discharge to the external signal connection. Typically, such ESD protection includes a series inductance or resistance providing a small impedance at normal operating frequencies but a high impedance to static discharge, along with one or more sets of overvoltage clamping diodes or thyristors to limit fault voltage amplitude.

The correct sub-channel polarities for each wire are determined by using non-inverting or inverting buffers in 210; for wire 0, bit 2 and bit 3 are non-inverting, and bit 4 is inverting. The configuration of the inverting and non-inverting buffers is illustrated by the left-most column of the matrix of Eqn. 1, as bits 2 and 3 modulate positive-sign wire-specific sub-channel components (3 and 2, respectively), while bit 4 modulates a negative-sign wire-specific sub-channel component (−3). The magnitudes of the weights with which the sub-channels are summed at node 225 are implemented by a number of individual drivers operating in parallel within sub-channel driver element groups 220, 230, and 240. In FIG. 2, bits 2 and 4 are weighted by magnitudes of three, while bit 3 is weighted by a magnitude of two. Such weighting factors are also illustrated in the columns of the matrix of Eqn. 1. In some embodiments, equivalent results may be obtained using complementary buffers at 210 and inverting output drivers at 220, 230, and 240.

For the architecture of all wire driver instances in this example to be identical (which facilitates circuit layout and close matching of operating characteristics,) a common denominator is determined for the weights of all the wires, the common denominator equivalent to a maximum depth or number of wire driver elements, allowing integer numbers of wire driver element instances to represent all of the possible matrix weight values. In the present example, a depth of nine driver elements is sufficient to produce the ten output levels of the equal-eye 5b6w_10_5 code. In the present example, wires wire 0, wire 1, wire 4, wire 5 utilize eight actively driven wire driver elements, and wires wire 2 and wire 3 utilize seven actively driven wire driver elements. The values for each wire may be obtained by summing the weighted analog signal components corresponding to the bit-modulated (and non-common-mode) wire-specific sub-channel components for each column in Eqn. 1.

To preserve layout symmetry and component matching, the embodiment illustrated in FIG. 2 shows three-element driver module design for sub-channel driver element groups 220, 230, and 240. Where fewer paralleled driver instances are used, a selected number of drivers are disabled as shown at 221. Thus, the different number of functional driver elements in sub-channel driver element groups 220, 230, 240 produce the 3:2:3 ratio of output weights, while the common modular design and layout consistently maintains the same capacitive loading on output node 225 and internal signal nodes such as node 215. The example of three-element modularity does not imply limitation, with other functionally equivalent embodiments relying on smaller or larger modular increments.

Figure 4:
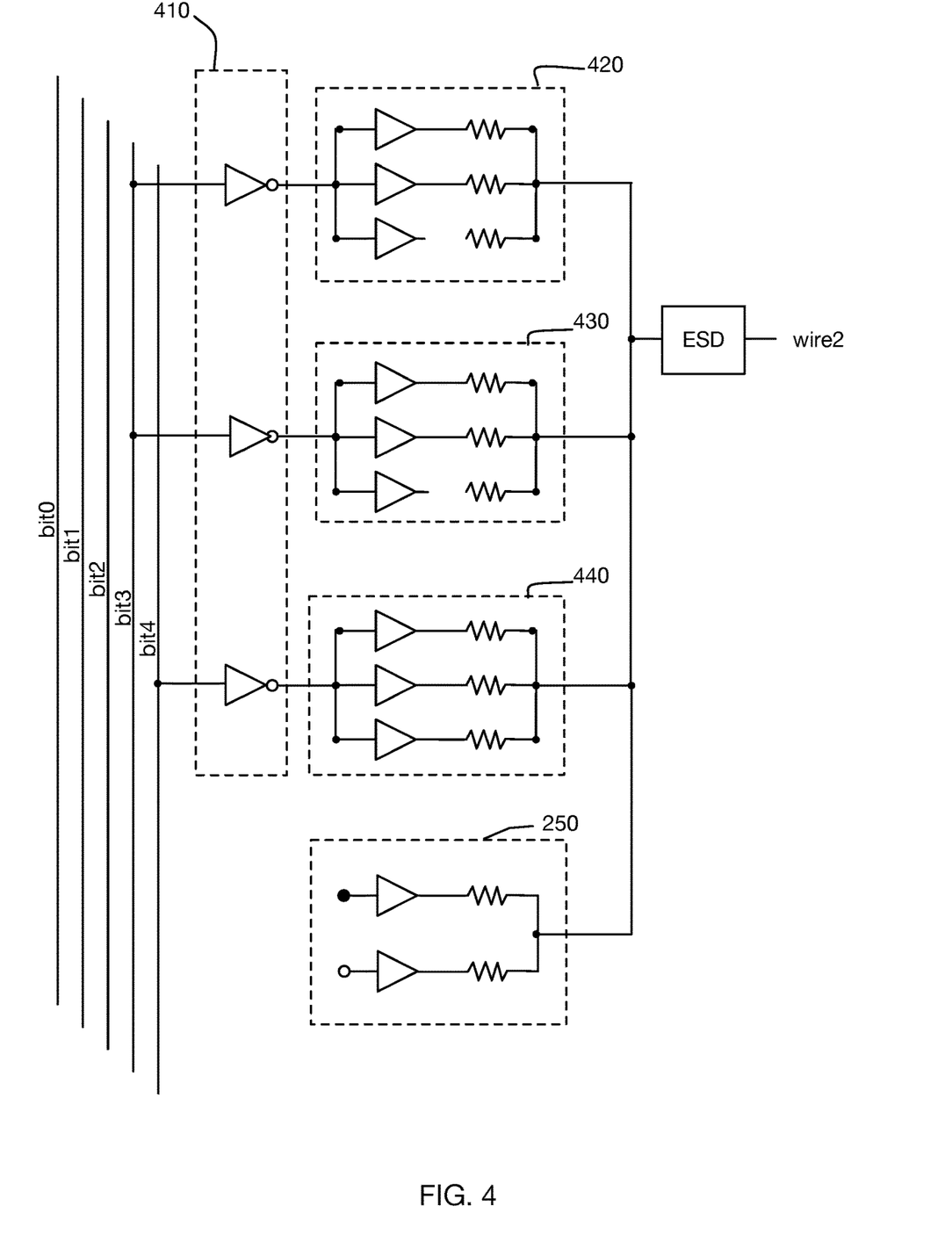
Figure 5:
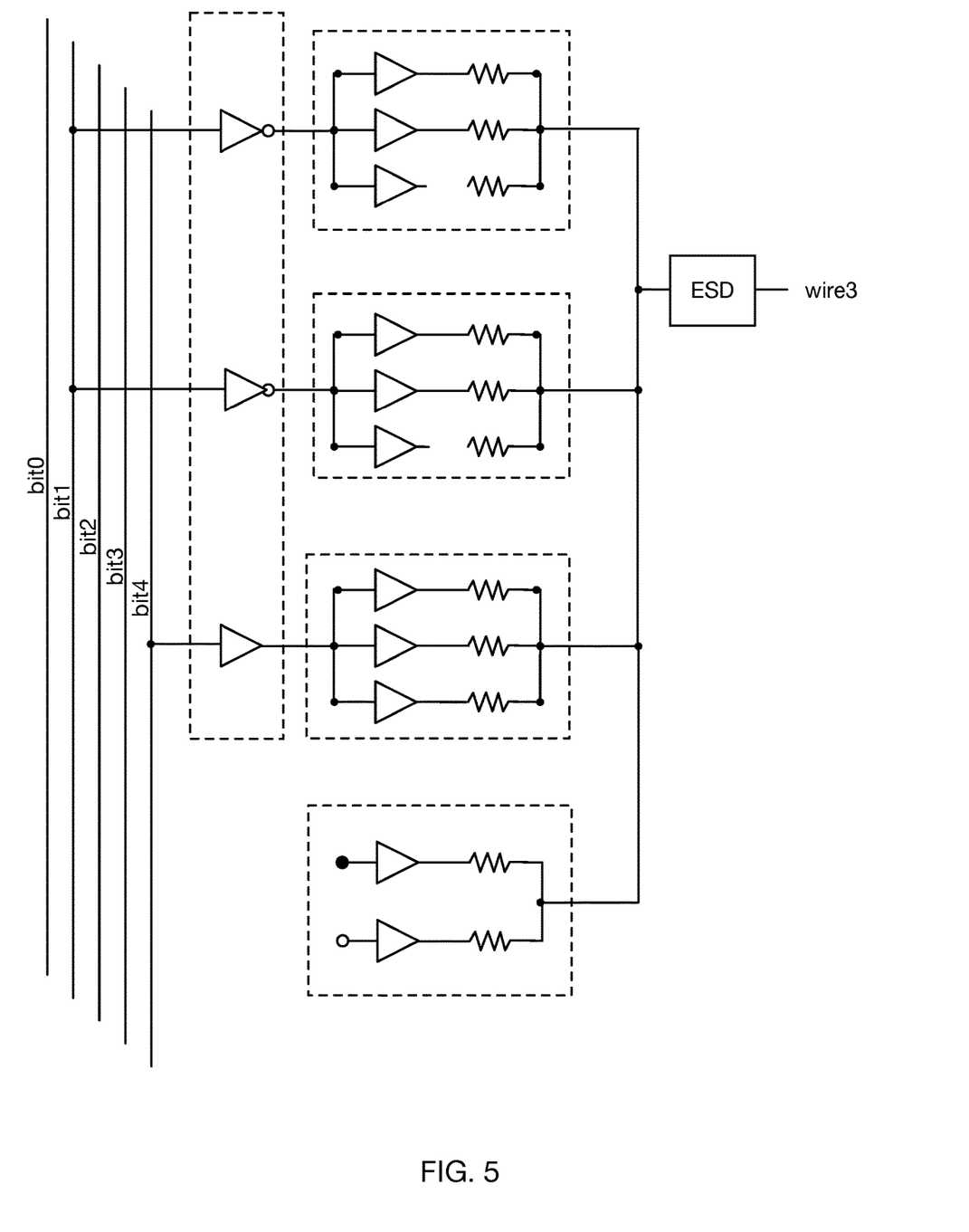
Figure 6:
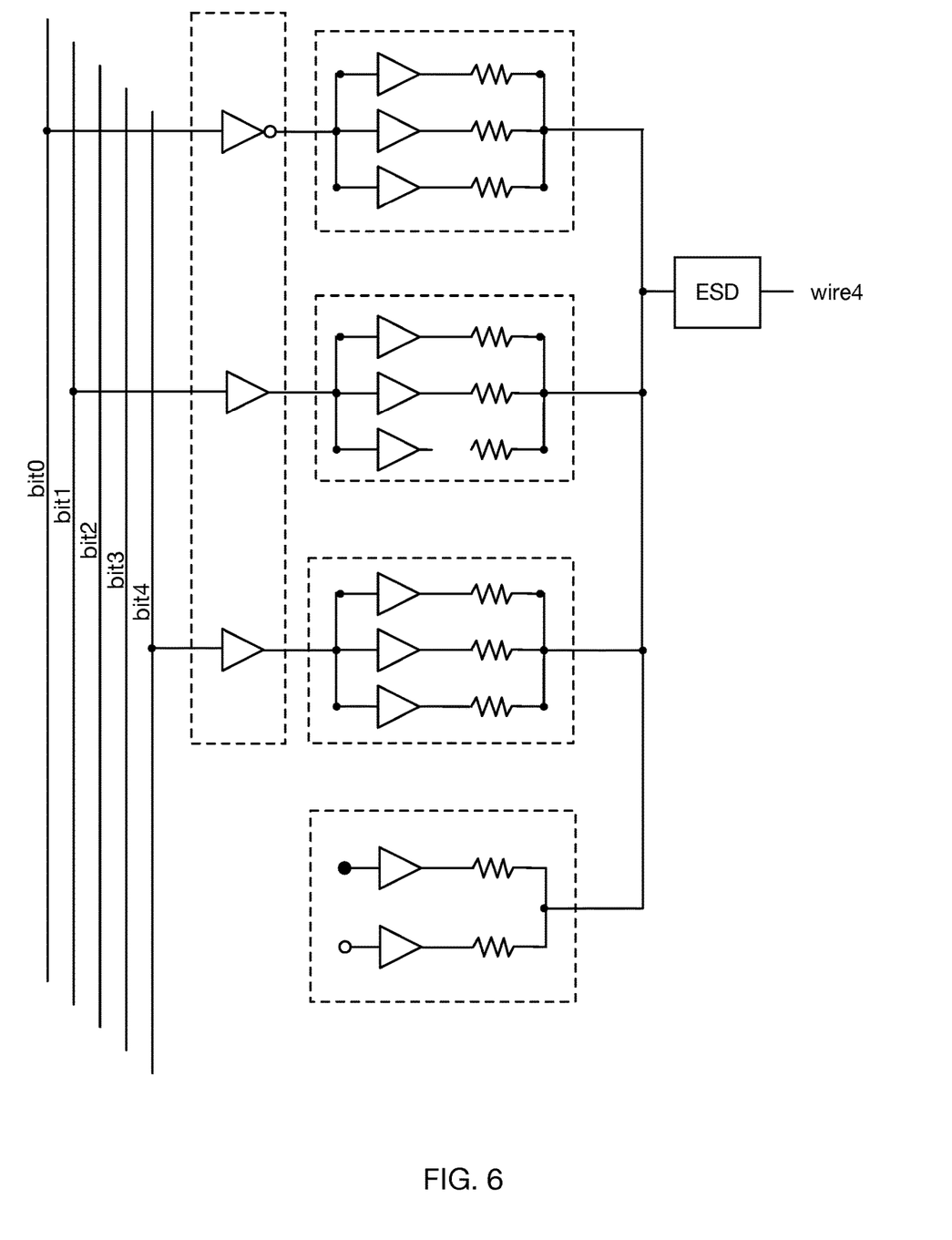
Figure 7:
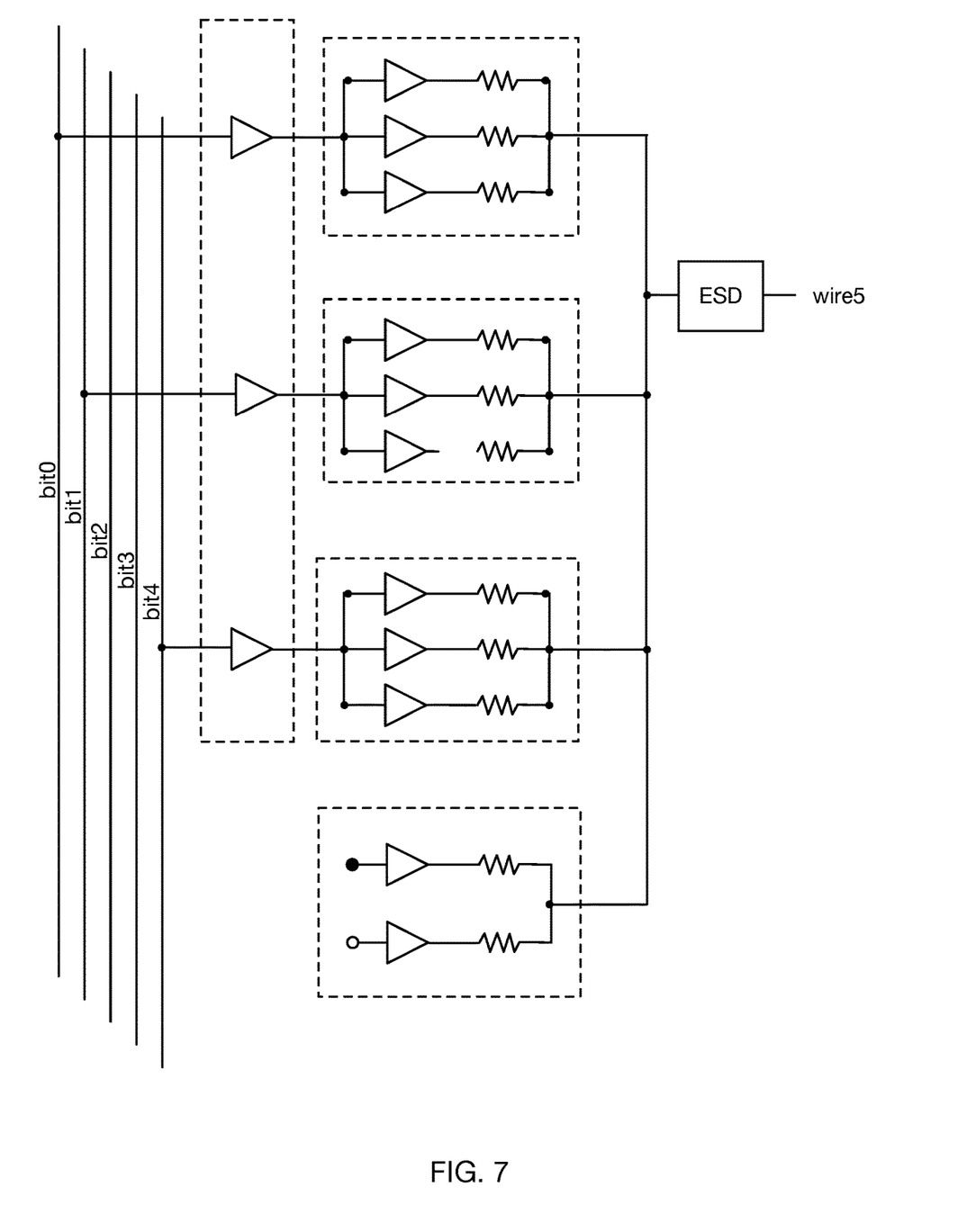

In some embodiments, options for disabling individual driver components includes removal of output driver power/ground connections, driver output connection, removal of one or more circuit components, etc. Thus, the number of functional or connected paralleled drivers can be made different on a sub-channel or wire basis to satisfy the code matrix while maintaining layout symmetry and consistent internal circuit node loading. FIG. 4 illustrates an exemplary wire driver for wire 2. According to Eqn. 1, wire 2 is only affected by sub-channels that are modulated according to bit 3 and bit 4. As each wire driver group 420, 430, and 440 only includes three driver elements, bit 3 is shown connected to driver groups 420 and 430, each group having two connected driver elements and one disconnected driver element, providing the weight of 4. Bit 4 is connected to driver group 440, providing a weight of 3.

The ninth driver element for wire 0, wire 1, wire 4, wire 5 (the disconnected driver element illustrated by 221 in FIG. 2) and the eighth and ninth driver elements for wire 2 and wire 3 may optionally be instantiated as non-data-driven (i.e. fixed output) driver instances as 250, to maintain a desired bias or common mode signal level. In some embodiments, a termination voltage halfway between the output "1" and output "0" level is desired, thus the non-data-driven instances may be instantiated in pairs, with one of the pair of driver inputs tied high and the other low. If an odd number of instances is desired, two non-data-driven instances may be connected as described above but with twice the normal output impedance, together representing a single driver load. Thus, in FIG. 2 the series resistors 257 are twice the value of resistors 227. In some embodiments, additional non-data-driven driver instances may be used to further adjust the common mode voltage produced.

In FIG. 2, the collection of wire driver elements can provide a matched transmission line impedance if the parallel connection of those elements (as in the example here, a depth of nine paralleled drivers per wire) equals the transmission line impedance. In this non-limiting example of nine parallel driver elements and a 50 ohm transmission line, a matching transmit impedance will be obtained when each driver element has a 450 ohm output impedance. In other embodiments, a higher driver output impedance is used that is intentionally mismatched to the transmission line impedance, where driver power consumption is of greater concern than potential transmit-end signal reflections, as described in [Amiri I].

FIGS. 3-7 illustrate similar multi-level driver embodiments for driving wires 0-5, each driver having respective configurations for (i) subset of the set of data bits received, (ii) inverting/non-inverting buffering for each data bit, and how many driver instances are used for each sub-channel component or non-data-driven bias component.

Figure 10:
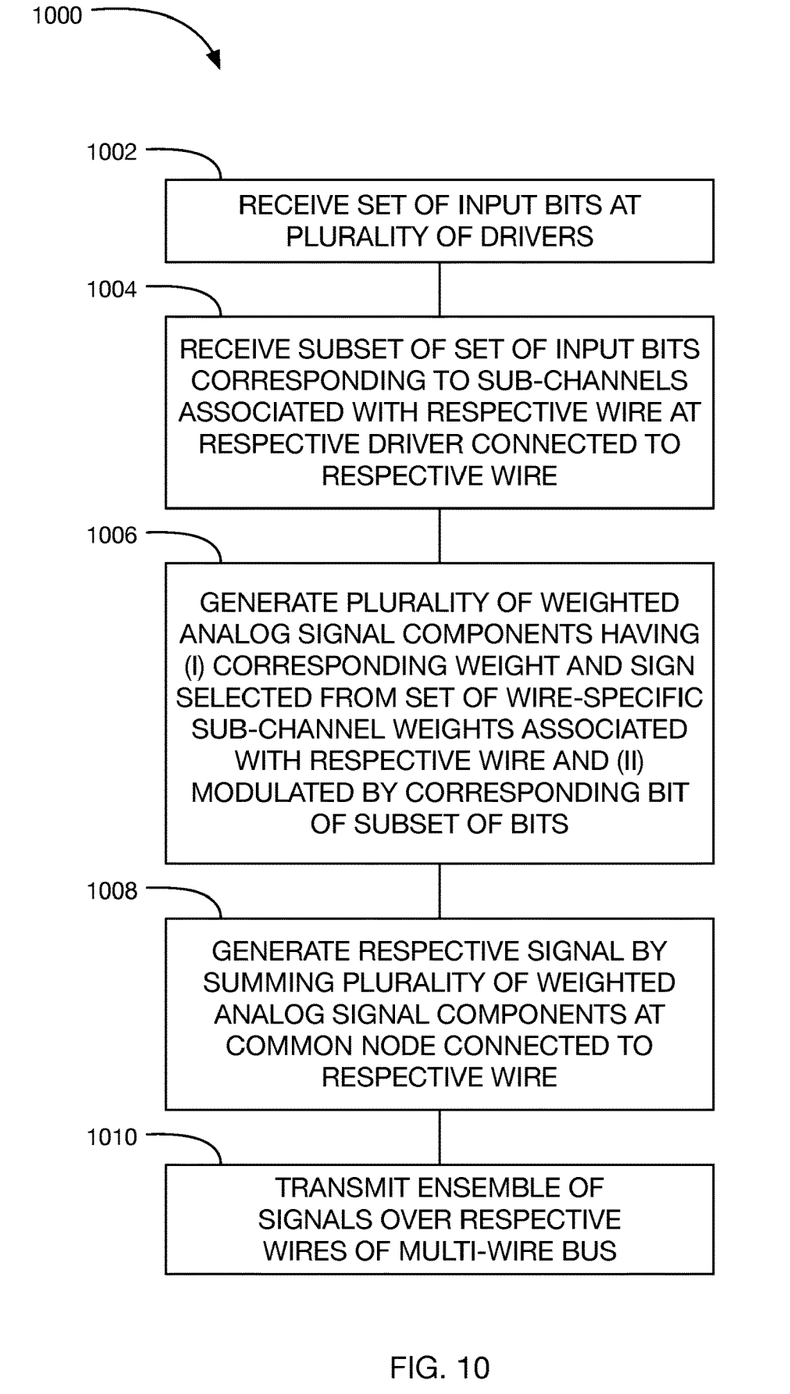
FIG. 10 is a flowchart of a method, in accordance with some embodiments.

The line driver 118 in FIG. 1 may take the form of a collective arrangement of the wire drivers shown in FIGS. 2-7, represent a complete six wire output driver embodiment for the 5b6w-10 vector signaling code of [Shokrollahi I]. FIG. 10 is a flowchart of a method 1000, in accordance with some embodiments. As shown, method 1000 includes receiving 1002 a set of input bits at a plurality of drivers, one such driver illustrated by the schematic of FIG. 2. Each driver receives 1004 subset of the set of input bits, the received subset of bits corresponding to sub-channels associated with the respective wire. Each driver generates 1006 a plurality of weighted analog signal components, each weighted analog signal component (i) having a corresponding weight and sign selected from a set of wire-specific sub-channel weights associated with the respective wire and (ii) modulated by a corresponding bit of the received subset of bits. As shown in FIG. 2, each sub-channel driver element group 220, 230, and 240 generates a respective weighted analog signal component, the magnitude of the weight being determined by the number of enabled driver elements (three in the case of sub-channel driver element group 220), and the sign applied by the buffering element in 210 being inverting or non-inverting. The magnitudes and signs of the sets of wire-specific sub-channel components may be determined according to columns of the matrix of Eqn. 1. For example, for wire w0, the set of wire-specific sub-channel components corresponds to column 1 of the matrix 3, 2, and −3 (without the 1/3 scaling factor and excluding the common-mode row). The magnitude of each sub-channel component determines how many driver elements are enabled for the sub-channel component, while the sign of each sub-channel component determines if a non-inverting (positive sign) or inverting (negative sign) buffer is applied to the corresponding bit that modulates the sub-channel component. The respective signal of the ensemble of signals is generated 1008 by forming a summation of the plurality of weighted analog signal components at common node 225 connected to the respective wire, and the respective signal responsively transmitted 1010 over the respective wire of the multi-wire bus.

In some embodiments, the ensemble of signals represents a codeword of a vector signaling code.

In some embodiments, generating each weighted analog signal component includes connecting one or more driver elements of a sub-channel driver element group in parallel to the respective wire. In FIG. 2, sub-channel driver element group 2 generates a weighted analog signal component by applying a weight of '3' to bit 2, as three driver elements are connected to common node 225, while sub-channel driver element group 2 generates a weighted analog signal component by applying a weight of '2' to bit 3, as two driver elements are connected to common node 225. As shown, both buffering elements in 210 are non-inverting for bits 2 and 3. Sub-channel driver element group 240 generates a weighted analog signal component by applying a weight of '−3' to bit 4, as there are three driver elements connected to the common node 225, and the buffering stage for bit 4 in 210 is inverting. Thus, the corresponding weight of the weighted analog signal component corresponds to a number of connected driver elements in the sub-channel driver element group.

In some embodiments, each multi-level driver of the plurality of multi-level drivers has an equal total number of driver elements. In FIGS. 2-7, each multi-level driver includes nine total driver elements throughout the sub-channel driver element groups, as well as an extra group (e.g., 250) of two driver elements to maintain implementation symmetry.

In some embodiments, a total number of connected driver elements in a first multi-level driver of the plurality of multi-level drivers is different than a total number of connected driver in a second multi-level driver of the plurality of multi-level drivers. For example, the multi-level driver connected to wire 0 shown in FIG. 2 has eight driver elements connected (excluding non-data-driven elements 250), while the multi-level driver connected to wire 2 shown in FIG. 4 has seven driver elements connected to a common node (excluding non-data-driven elements 250). In some embodiments, each driver element in the sub-channel driver element group includes a push-pull driver for adjusting a voltage of the respective wire by sourcing or sinking current from the respective wire of the multi-wire bus.

In some embodiments, the method includes, for each input bit of the subset of bits, inverting or not inverting the corresponding input bit according to the corresponding sign. Such an inversion is performed by bit signer 210 having a combination of inverting and/or non-inverting buffering elements as determined by the signs of the sub-channel specific weights in the matrix of Eqn. 1.

In some embodiments, the method further includes receiving a plurality of phases of sets of bits and responsively selecting the set of input bits according to a clock selection signal. Such an embodiment may utilize the multiplexing structure shown in FIG. 9.

In some embodiments, each set of wire-specific sub-channel weights corresponds to a row of an orthogonal matrix, each row of the orthogonal matrix being mutually-orthogonal. Such a matrix is given in Eqn. 1. In some embodiments, the orthogonal matrix is an equal-eye matrix.

In some embodiments, the plurality of sub-channels may be modulated synchronously, in which the ensemble of signals generated corresponds to a codeword of a vector signaling code. Alternatively, each sub-channel may be asynchronously modulated, each bit thus transmitted asynchronously over the multi-wire bus.

The set of input bits is unconstrained and thus may take on any value, with each such set of input bits inherently producing a unique and repeatable output result representing the aggregate state of the transmission at each unit interval, thus the described embodiment is capable of functionally reproducing every codeword of the vector signaling code.

As is apparent by comparison to the combination of codeword encoder and multilevel output driver such as described by [Ulrich I], the present embodiment is both less complex and potentially easier to lay out as an integrated circuit design. The simple inverter/non-inverter data buffer logic is considerably less complex than the Boolean logic used to implement a codeword encoder, and the binary data bits introduce far less signal routing complexity than encoded codeword symbols.

It should be noted that the number of bits, the number of wires, and the number of driver elements/slices in each wire driver in the described examples should not be considered limiting. Other numbers of driver elements can be used in each wire driver, as well as different combinations/weights of the bits.

Additional Driver Instances

As described in [Ulrich I], there can be significant implementation benefits from using more instances of high-impedance output drivers or "slices" in parallel, versus a smaller number of lower impedance output drivers, and the present embodiment is conducive to such combination.

Figure 8:
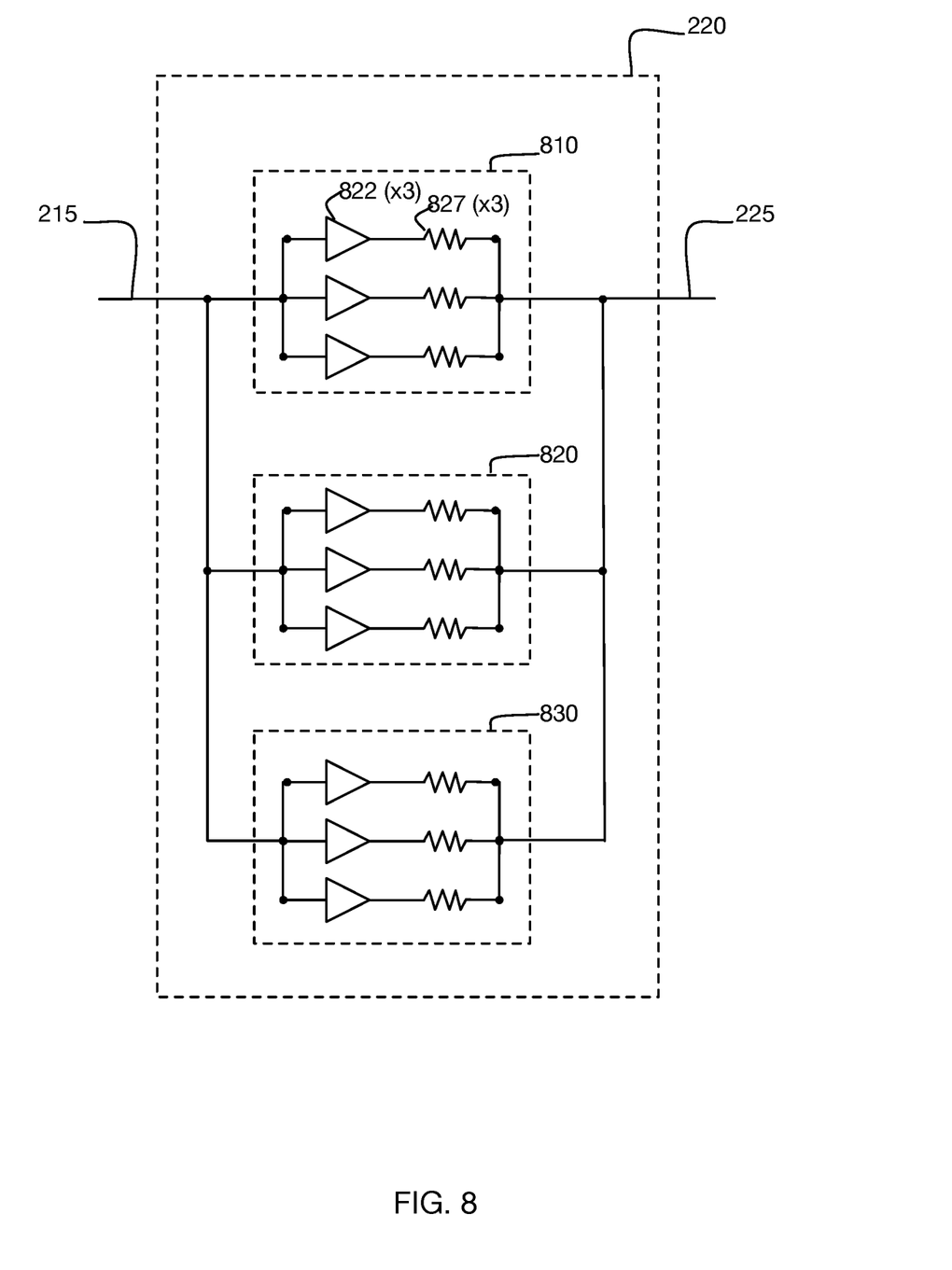
FIG. 8 is a schematic of another embodiment of a multilevel line driver element such as used in FIG. 2.

FIG. 8 shows one embodiment of a driver element that is functionally equivalent to sub-channel driver element group 220 of FIG. 2, but internally comprised of three sets of driver element instances 810, 820, and 830. Within 810, each series resistor 827 has a resistance three times that of a series resistor 227 of FIG. 2, and each driver element 822 handles one third the current of driver element 222 of FIG. 2. Following the common-layout-module model previously described, an embodiment applying this technique to the design of FIG. 2 would substitute the design of FIG. 8 for each of FIG. 2's 220, 230, 240, and optionally 250, those substitutions differing only in the number of active vs. disabled driver instances. Other embodiments may utilize fewer or greater numbers of paralleled drivers, versus the three instances 820 of this example. In some embodiments, a "slice" may correspond to the entire structure as shown in FIG. 2 for example, and a plurality of such "slices" may be arranged in parallel for wire 0.

Integration with Multiphase Data Processing

It is common practice to incorporate multiple essentially parallel data processing instances to facilitate processing of data at these high rates. [Shokrollahi I] and [Ulrich I] describe embodiments with four or more parallel processing instances, as examples.

Figure 9:
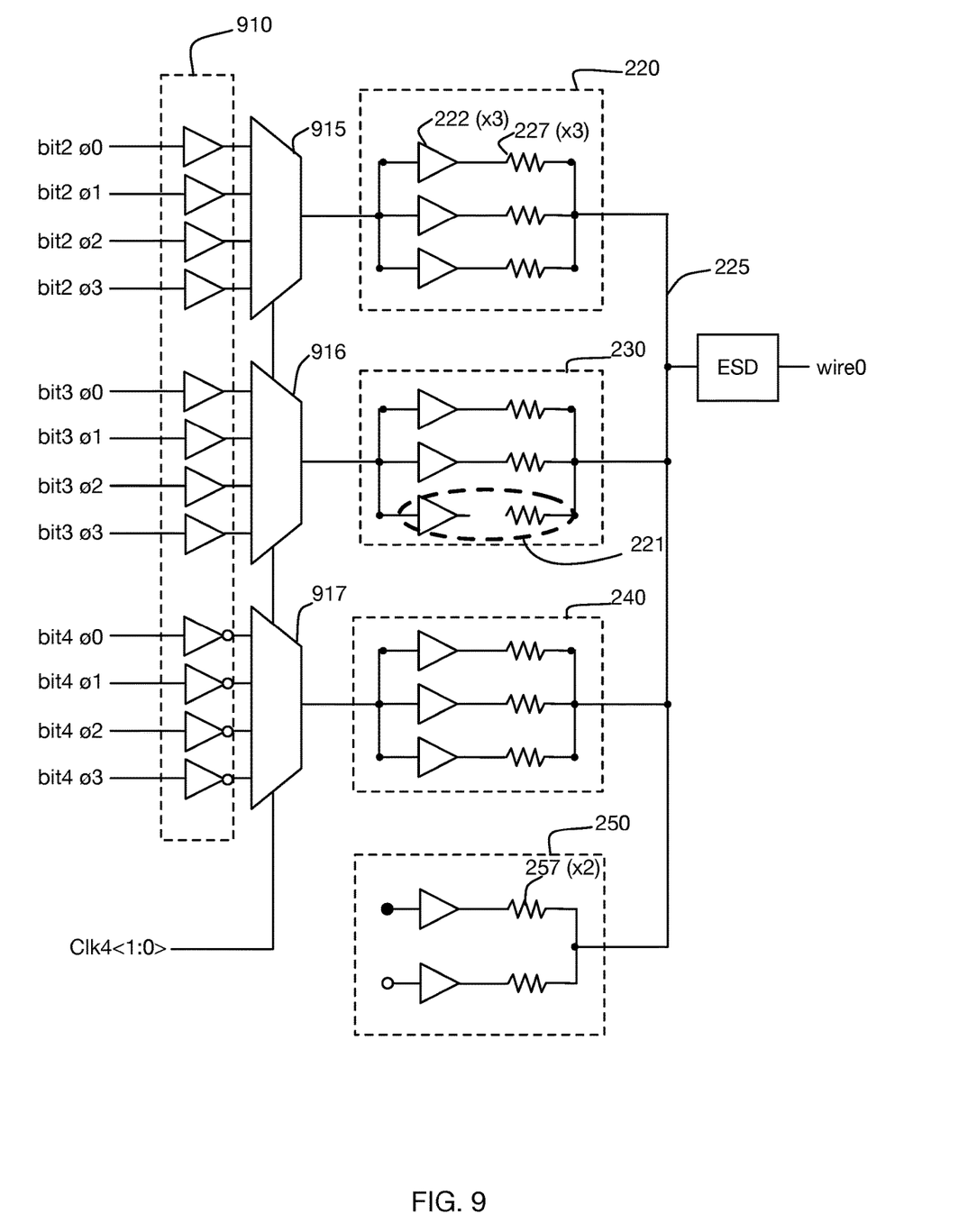
FIG. 9 is a schematic of a further embodiment of a multilevel line driver, incorporating high speed multiplexers to combine four phases of output data into a single high speed output stream.

The driver of FIG. 9 is identical to that of FIG. 2, except that data to be transmitted is obtained from four essentially parallel processing phases. Thus, data buffer 910 contains four identical buffering instances for each input bit, each drawing the same data bits from different data processing phase. Digital multiplexers 915, 916, 917 controlled by four-phase clocks Clk4<3:0> sequentially select data from each phase, producing a single output stream at four times the rate. As in the previous example, the number of data phases and location of the data multiplexers were chosen for descriptive clarity, and do not imply limitation.

Similarly, although the same clock is illustrated as controlling digital multiplexers 915, 916, 917 essentially in parallel, other embodiments may introduce different timing delays, e.g. using phase delay elements or phase interpolators, causing the different sub-channel results or the combined wire result to change at different times. Further embodiments may go beyond this isochronous clock behavior, to allowing one or more of the sub-channels to transition asynchronously.

This approach to combining data from multiple data source phases, or indeed from any wider, slower interface or buffering medium may used in combination with other elements described herein, or with other known art approaches without limitation.

We claim:

1. An apparatus comprising:
    a plurality of multi-level drivers configured to receive a set of input bits and to responsively generate a set of signals corresponding to symbols of a codeword of a vector signaling code, each multi-level driver of the plurality of multi-level drivers connected to a respective wire of a multi-wire bus and configured to generate a respective signal of the set of signals, each multi-level driver comprising:
        a data buffer configured to receive a subset of the set of input bits, the received subset of the set of input bits corresponding to sub-channels associated with the respective wire, the data buffer configured to generate a respective set of signed input bits by applying a respective sign to each input bit of the subset of the set of input bits, the respective sign determined by a respective wire-specific sub-channel weight;
        a plurality of sub-channel driver element groups configured to generate a plurality of weighted analog signal components, each sub-channel driver element group configured to accept a respective signed input bit of the respective set of signed input bits and to generate a respective weighted analog signal component having a magnitude determined by a number of enabled driver elements connected in parallel in the sub-channel driver element group; and
        a summation node connected to the respective wire, the summation node configured to generate the respective signal of the set of signals for transmission over the respective wire by forming a summation of the plurality of weighted analog signal components.

2. The apparatus of claim 1, wherein the data buffer comprises logic inverters configured to invert one or more of the received subset of the set of input bits to generate the respective set of signed input bits.

3. The apparatus of claim 1, wherein each sub-channel driver element group of the plurality of sub-channel driver element groups include an equal number of enabled driver elements.

4. The apparatus of claim 1, wherein at least one sub-channel driver element group of the plurality of sub-channel driver element groups comprises at least one disabled driver element.

5. The apparatus of claim 1, wherein at least two sub-channel driver element groups of the plurality of sub-channel driver element groups comprise different numbers of enabled driver elements.

6. The apparatus of claim 1, wherein the enabled driver elements comprise push-pull drivers configured to source or sink current from the summation node.

7. The apparatus of claim 1, wherein the vector signaling code is an orthogonal differential vector signaling (ODVS) code.

8. The apparatus of claim 7, wherein the ODVS code is an equal-eye ODVS code.

9. The apparatus of claim 1, wherein at least one multi-level driver receives a subset of the set of input bits corresponding to all input bits of the set of input bits.

10. The apparatus of claim 1, wherein at least two multi-drivers of the plurality of multi-level drivers receive corresponding subsets of the set of input bits having different numbers of input bits of the set of input bits.

11. A method comprising:
    receiving, at a multi-level driver of a plurality of multi-drivers, a subset of a set of inputs, the received subset of input bits corresponding to sub-channels associated with a respective wire of a multi-wire bus;
    generating a set of signed input bits using a data buffer by applying a respective sign to each input bit of the subset of the set of input bits, the respective sign determined by a respective wire-specific sub-channel weight;
    generating a plurality of weighted analog signal components using a plurality of sub-channel driver element groups accepting the set of signed input bits, each sub-channel driver element group configured to accept a respective signed input bit of the set of signed input bits and to generate a respective weighted analog signal component having a magnitude determined by a number of enabled driver elements in the sub-channel driver element group; and
    generating a signal for transmission over the respective wire by forming an analog summation of the plurality of weighted analog signal components.

12. The method of claim 11, wherein generating the set of signed input bits comprises logically inverting one or more of the received subset of the set of input bits.

13. The method of claim 11, wherein the plurality of sub-channel driver element groups comprises an equal number of enabled driver elements as a second plurality of sub-channel driver element groups associated with a second wire of the multi-wire bus.

14. The method of claim 11, wherein at least one sub-channel driver element group of the plurality of sub-channel driver element groups comprises at least one disabled driver element.

15. The method of claim 11, wherein at least two sub-channel driver element groups of the plurality of sub-channel driver element groups comprise different numbers of enabled driver elements.

16. The method of claim 11, wherein generating the weighted analog signal components comprises sourcing or sinking current from the summation node the enabled driver elements using push-pull drivers.

17. The method of claim 11, wherein the vector signaling code is an orthogonal differential vector signaling (ODVS) code.

18. The method of claim 17, wherein the ODVS code is an equal-eye ODVS code.

19. The method of claim 11, wherein the subset of the set of input bits corresponds to all input bits of the set of input bits.

20. The method of claim 11, wherein at least two multi-drivers of the plurality of multi-level drivers receive corresponding subsets of the set of input bits having different numbers of input bits of the set of input bits.

* * * * *